(12) United States Patent
Zoeller et al.

(10) Patent No.: US 10,668,875 B2
(45) Date of Patent: Jun. 2, 2020

(54) MANAGEMENT CONTROL DEVICE FOR A VEHICLE

(71) Applicant: Dr. Ing. h.c. F. Porsche Aktiengesellschaft, Stuttgart (DE)

(72) Inventors: Rolf Zoeller, Leonberg-Warmbronn (DE); Ruediger Roppel, Flieden (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 264 days.

(21) Appl. No.: 15/452,875

(22) Filed: Mar. 8, 2017

(65) Prior Publication Data

US 2017/0259762 A1   Sep. 14, 2017

(30) Foreign Application Priority Data

Mar. 9, 2016   (DE) .................. 10 2016 104 290

(51) Int. Cl.

| | |
|---|---|
| *B60R 16/023* | (2006.01) |
| *G01M 15/00* | (2006.01) |
| *G01C 21/36* | (2006.01) |
| *H04W 4/50* | (2018.01) |
| *G06F 21/60* | (2013.01) |
| *B60R 25/24* | (2013.01) |
| *G05D 1/00* | (2006.01) |

(Continued)

(52) U.S. Cl.
CPC .......... *B60R 16/0231* (2013.01); *B60R 25/24* (2013.01); *G05D 1/0011* (2013.01); *G06F 8/65* (2013.01); *G06F 21/602* (2013.01); *H04L 67/12* (2013.01); *H04L 67/34* (2013.01); *H04W 4/50* (2018.02)

(58) Field of Classification Search
CPC ...... B60R 25/10; B60R 16/023; G01M 15/00; G06F 15/177; H04W 4/50; G07C 5/008; G01C 21/36; G01C 21/3446; B60Q 9/00; G05D 1/00

See application file for complete search history.

(56) References Cited

U.S. PATENT DOCUMENTS 5,172,321 A * 12/1992 Ghaem ............. G01C 21/3446
                                                      340/995.12
6,025,776 A *  2/2000 Matsuura ............... G07C 5/008
                                                      340/438

(Continued)

FOREIGN PATENT DOCUMENTS

CN       1508364 A    6/2004
CN     102717797 A   10/2012

(Continued)

*Primary Examiner* — Yuri Kan
(74) *Attorney, Agent, or Firm* — Leydig, Voit & Mayer, LTD.

(57) ABSTRACT

A method for implementing at least one function, provided by an external server, in a control device of a vehicle includes transmitting the at least one function from the external server via a wireless interface to a management control device arranged in the vehicle; transmitting, by the management control device, the at least one function to at least one control device of the vehicle; and implementing the at least one function in the at least one control device. The at least one control device controls the vehicle in accordance with the at least one function.

17 Claims, 1 Drawing Sheet

(51) Int. Cl.
    *G06F 8/65*          (2018.01)
    *H04L 29/08*       (2006.01)

(56) References Cited

U.S. PATENT DOCUMENTS

| | | | |
|---|---|---|---|
| 7,519,455 B2 * | 4/2009 | Weiss | B60R 16/02 |
| | | | 701/2 |
| 7,631,056 B2 * | 12/2009 | Kouda | H04L 29/12009 |
| | | | 709/220 |
| 8,874,303 B2 * | 10/2014 | Ishida | B60R 16/0236 |
| | | | 701/102 |
| 9,120,452 B2 * | 9/2015 | Nishimoto | B60R 25/1001 |
| 9,280,653 B2 | 3/2016 | Forest | |
| 9,393,918 B2 * | 7/2016 | Hrabak | B60R 16/0231 |
| 9,550,454 B1 * | 1/2017 | Roisen | G08B 21/24 |
| 9,909,898 B2 * | 3/2018 | Konishi | G01C 21/3685 |
| 2005/0068191 A1 | 3/2005 | Eschke et al. | |
| 2006/0235580 A1 | 10/2006 | Weiss et al. | |
| 2007/0021157 A1 | 1/2007 | Chen et al. | |
| 2014/0082470 A1 | 3/2014 | Trebas et al. | |
| 2015/0032800 A1 | 1/2015 | Hrabak | |

FOREIGN PATENT DOCUMENTS

| | | |
|---|---|---|
| CN | 103685214 A | 3/2014 |
| CN | 105235471 A | 1/2016 |
| DE | 102005058366 A1 | 2/2007 |
| EP | 0518383 B1 | 9/1997 |
| EP | 1516292 B1 | 12/2005 |

\* cited by examiner

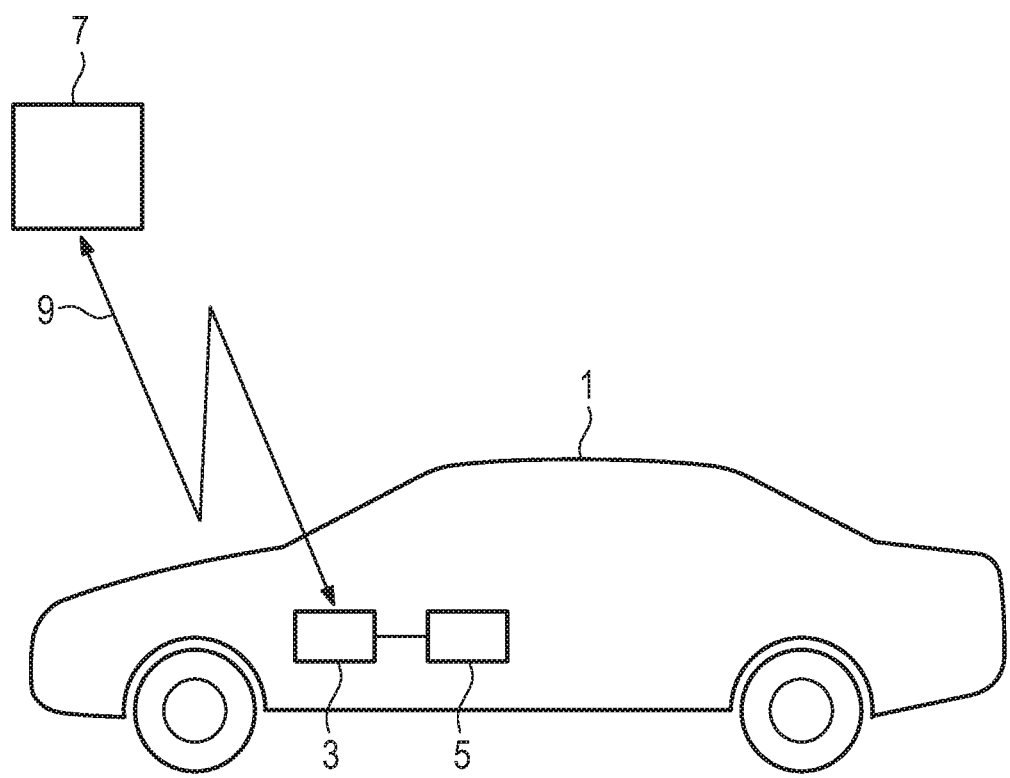

US 10,668,875 B2

MANAGEMENT CONTROL DEVICE FOR A VEHICLE

CROSS REFERENCE TO RELATED APPLICATIONS

This application claims benefit to German Patent Application No. DE 10 2016 104 290.0, filed Mar. 9, 2016, which is incorporated by reference herein.

FIELD

The present invention relates to a method for implementing at least one function provided by an external server in a control device of a vehicle. The present invention also relates to a vehicle and to a management system.

BACKGROUND

Vehicles are complex machines which, as a rule, are controlled by using numerous programs. To adapt various programs of a respective vehicle to current needs of a respective user or to a current situation of the vehicle or to update respective programs already present in the vehicle to a current status, the vehicle must be brought to a technician who transfers respective modified programs to the vehicle.

In the German patent document DE 10 2005 058 366 A1, a method is disclosed in which data to be transferred to a vehicle are identified with an identification code.

European patent document EP 1 516 292 B1 relates to a vehicle-related telematics service with a wireless interface for activating a functionality of a vehicle.

In European patent document EP 518 383 B1, a method for remote diagnosis or remote control of a vehicle is disclosed.

US American patent application US 2005/0068191 A1 discloses a vehicle with a control device to which data are to be transferred by means of a wireless interface.

A method for distributing data among a number of users is disclosed in US American patent document US 2014/0082470 A1.

A method for transferring contents to an entertainment system of a vehicle is disclosed in US American patent document US 2015/0032800 A1.

SUMMARY

In an embodiment, the present invention provides a method for implementing at least one function, provided by an external server, in at least one control device of a vehicle. The method includes transmitting the at least one function from the external server via a wireless interface to a management control device arranged in the vehicle; transmitting, by the management control device, the at least one function to at least one control device of the vehicle; and implementing the at least one function in the at least one control device. The at least one control device controls the vehicle in accordance with the at least one function.

BRIEF DESCRIPTION OF THE DRAWING

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrate the following:

FIG. 1 shows a diagrammatic representation of a method according to an embodiment of the invention.

DETAILED DESCRIPTION

Embodiments of the present invention describe transfer of a function from a server to a control device of a vehicle and its activation in the control device.

Thus, a method for implementing at least one function, provided by an external server, in a control device of a vehicle is presented herein, the at least one function being transmitted from the external server via a wireless interface to a management control device arranged in the vehicle and the management control device transfers the at least one function to at least one control device of the vehicle and implements it in the at least one control device, and wherein the at least one control device controls the vehicle in accordance with the at least one function.

Within the context of the invention presented, the term "implement" is to be understood to be a process in which a function is transferred to a respective control device and is deposited there executably. In particular, "implement" is to be understood to be a flashing process.

During the transmission of functions to vehicles, the problem regularly arises that the functions are to be implemented in the vehicles, i.e. to be transferred into respective control devices of the vehicles and to be activated there, as a result of which a control software of a respective vehicle is altered. Since vehicles protect their control software against external accesses, a transmission by means of publically accessible interfaces such as, e.g., an OBD interface, is not always possible. By a management control device provided according to an embodiment of the invention, it is possible to receive functions or corresponding data, respectively, from an external server, to decode these, if necessary, within a respective vehicle, transfer them to a control device of the vehicle and to implement them or to activate them in the control device. For this purpose, the management control device provided according to an embodiment of the invention can be connected to the vehicle in such a manner that the management control device can access a control command set of the vehicle and, due to that, alter functions of the vehicle or of the respective control device of the vehicle. In particular, it is provided that the management control device provided according to an embodiment of the invention can access a CAN bus of a respective vehicle in order to flash, e.g., a control device.

The management control device provided according to an embodiment of the invention serves as intermediary between a respective vehicle and an external server in which it receives control commands conveyed from the external server via a wireless interface, preprocesses them for a communication with the vehicle and implements according to specific requirements of the vehicle on respective control devices of the vehicle. In this context, the wireless interface can be designed as part of the management control device itself or connected to the management control device via a further interface. To provide for access of the management control device to control devices and/or data connections of a respective vehicle, the management control device provided according to an embodiment of the invention can comprise a computer unit and a vehicle interface for connecting the management control device to the vehicle. By means of a vehicle interface between management control device and vehicle, respective data received from the server can be transferred rapidly and possibly converted into a corresponding data format to a respective control device. For this purpose, the management control device can carry out a conversion of control commands conveyed by the server into a respective data format of the vehicle.

In particular, the management control device can be linked directly into a data management structure, i.e. into respective communication lines of the vehicle.

Naturally, the management control device can also comprise a data memory for conveying data to the server offset in time or from the server to a respective control device of the vehicle.

In particular, the method presented serves for recording updated software versions on respective control devices of a respective vehicle so that the vehicle can always be adjusted updated and correspondingly optimized even without visiting the workshop. Thus, e.g., an exhaust-gas characteristic of the vehicle or a fleet of vehicles of a number of vehicles can be changed by using the method presented and adapted, e.g., dynamically, to current environmental conditions or legal regulations.

A method according to an embodiment of the invention provides for a vehicle-specific adaptation of preconfigured control devices. This means control devices which, e.g., are produced in large numbers and are preconfigured for a multiplicity of different vehicles, can be altered in their configuration by means of the method presented and adapted individualized in their functionality to a respective vehicle.

A method according to an embodiment of the invention can also be used for exchanging data between various vehicles or detecting selectively predetermined data of a number of vehicles, for example within a particular period.

In a further possible embodiment, a method is provided in which the at least one control device exchanges data with the external server in dependence on a respective transmitted function by using the management control device.

Naturally, it is also conceivable that the management control device provided according to an embodiment of the invention receives not only data or control commands, respectively, from the external server provided according to an embodiment of the invention, but also conveys data such as, e.g., vehicle-specific data, to the external server. Conveying vehicle-specific data such as, e.g., current adjustments or a current position of the vehicle, enables respective functions implemented in the vehicle to be tuned to a current situation of the vehicle and, for example, a dynamic adaptation of the vehicle to local situations to be achieved.

Furthermore, a data exchange of a respective vehicle with an external server by using the method according to an embodiment of the invention also provides for a comprehensive diagnosis of the vehicle since the management control device provided according to an embodiment of the invention, in contrast to simple interface-based transmission modules, can acquire all data of the vehicle and provide them for a transmission. Thus, it is conceivable, e.g., to perform a diagnosis of an engine of a vehicle by means of the method presented and, if necessary, implement a software update of an engine control device of the vehicle.

In order to provide for a permanent data exchange between the external server provided according to an embodiment of the invention and the management control device provided according to an embodiment of the invention, the management control device can communicate with the server via a push-pull protocol.

Since the management control device provided according to an embodiment of the invention, in a possible embodiment, comprises its own memory, it is also possible temporarily to store data to be transferred to a respective vehicle and to implement them in dependence on an event, such as, e.g., a numerical process or a vehicle-internal triggering event in a respective control device.

A management control device equipped with a memory also provides for a dynamic data transmission in which, e.g., data are exchanged between the external server provided according to an embodiment of the invention and the management control device only when an adequate data transmission rate is available so that an incremental or cumulative data transmission is provided for.

In a further possible embodiment of a method, it is provided that the at least one control device, by using the management control device in dependence on at least one vehicle parameter of the following list of vehicle parameters, exchanges data with the external server: current vehicle position, current speed of the vehicle, current engine data of the vehicle or current settings of the vehicle.

By a communication depending on a current state of a respective vehicle between the management control device provided according to an embodiment of the invention and the external server provided according to an embodiment of the invention, it is possible to adapt respective data to be transmitted or control commands to the current state of the vehicle and, e.g., to transmit location—or engine-performance—dependent control commands to the management control device. Accordingly, e.g., an engine characteristic of a respective vehicle can be altered if the vehicle is driven from a location onto, e.g., a freeway or a racing track.

In another possible embodiment of a method it is provided that the at least one function extends a functional range of the at least one control device.

In another possible embodiment of a method, it is provided that part-functions of a function implemented on the at least one control device are implemented in the management control device and part-operations are performed in the management control device and transferred to the at least one control device.

By a suitable selection of control commands or functions to be transmitted to a respective vehicle, it is possible to widen a functionality of the vehicle with respect to, e.g., a state of delivery, i.e. in order to supplement additional functions. Accordingly, it is conceivable that a user of a respective vehicle can procure additional functions which, after the procurement are transferred to the vehicle in accordance with the method presented and are implemented there.

Furthermore, it is conceivable that by means of the management control device according to an embodiment of the invention, complex computing operations such as, e.g., diagnostic algorithms, are relocated to the external server provided according to the invention so that the external server, in the case when it is used, only conveys a result of a respective computing operation to the management control device according to an embodiment of the invention and the management control device carries out respective control functions in dependence on the result conveyed.

Naturally, a method presented also provides for archiving data on the external server provided according to an embodiment of the invention so that a user can get an insight into a history of the respective vehicle, e.g. during a potential vehicle purchase, and can assess the vehicle correspondingly with respect to its maintenance state and, as a result, to its value.

In a further possible embodiment of a method presented, it is provided that respective functions to be carried out by the at least one control device are deposited retrievably at least partially on the external server.

Through communication between the management control device provided according to an embodiment of the invention and the external server provided according to an embodiment of the invention, it is possible to provide, by the external server, a memory for functions which is available dynamically retrievably at any time so that a functionality currently stored on a respective vehicle can be kept as compact as possible and complex functionalities called up or provided, e.g., only when required or with authority of a respective user.

In a further possible embodiment of a method presented it is provided that respective part-operations of a respective function implemented on the at least one control device are performed on the external server and subsequently transferred to the management control device and from the management control device to the at least one control device.

A method presented enables a respective functionality to be carried out by using resources of a respective vehicle and the external server provided according to an embodiment of the invention. This means that respective functionalities are carried out, e.g., on the basis of distributed computing in which elaborate computing operation is carried out on the external server and smaller computing operations on a respective control device of the vehicle and/or the measurement control device itself.

In a further possible embodiment of a method presented it is provided that an unambiguous security key which must be provided for an access to the at least one control device from the external server is allocated to the management control device.

In order to provide for a high degree of security against unwanted and undesirable accesses to safety-related functions of a respective vehicle such as, e.g., a driver or brake management, a security key can be used which is deposited in the hardware of the management control device provided according to an embodiment of the invention and which must be provided and correspondingly calibrated for each access to respective control devices of the vehicle by the external server provided according to an embodiment of the invention.

Furthermore, the present invention relates to a vehicle comprising a management control device and a wireless interface for receiving data of at least one function of an external server, wherein the management control device is configured to implement respective data of at least one function transmitted from the external server to the management device on at least one control device of the vehicle.

The vehicle presented serves in particular for carrying out methods according to embodiments of the invention.

Furthermore, the present invention relates to a management system for functions of a vehicle, comprising at least one external server and one management control device in a vehicle, wherein the management control device is configured to communicate with the at least one server and wherein the server is configured to transmit, in dependence on a user input or an input conveyed from the management control device, at least one function stored on the at least one server via a wireless interface to the management control device.

The management control device presented serves, in particular, for carrying out methods according to embodiments of the invention.

In a possible embodiment of the management system presented it is provided that the at least one external server is configured to call up the at least one function from a further server and to transmit it to the management control device.

In order to transmit current functions or programs as quickly and efficiently as possible to a respective vehicle, it can be provided that the external server provided according to an embodiment of the invention is supplied with the current functions or programs by at least one further server.

In a further possible embodiment of a method presented it is provided that the management control device is a control device which is originally provided for controlling a component of the vehicle.

It is conceivable that the management control device provided according to an embodiment of the invention is designed as part of a control device already present in the respective vehicle. For this purpose, the control device already present can at least partially emulate or simulate the management control device according to an embodiment of the invention.

In FIG. 1, a vehicle 1 is shown which comprises a management control device 3 and a control device 5.

In order to change a functionality of the vehicle 1 such as, e.g., a temperature management, a target function which, compared with a current state of the vehicle 1 comprises altered control commands, is transferred from a server 7 via a wireless interface to the management control device 3 as indicated by arrow 9.

As soon as the target function has been transferred to the management control device 3, the management control device 3 implements the target function on the control device 5 so that the control device 5 controls the vehicle 1 with control commands according to the target function and, e.g., changes a temperature management of the vehicle 1. For this purpose, the management control device 3 accesses a CAN bus of the vehicle 1 and reflashes the control device 5 as result of which the target function is implemented in the control device 5.

In order to respond dynamically to a current situation of the vehicle 1, the server 7 can alter respective control commands of the target function in dependence on signals transmitted by the vehicle 1 by means of the management control device 3 to the server 7 such as, e.g., measurement values and adapt a functionality of the control device 5 to the current situation of the vehicle 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for implementing at least one target function in at least one controller of a vehicle, the at least one target function being provided by an external server, the method comprising:
transmitting the at least one target function in a first data format from the external server via a wireless interface to a management computer arranged in the vehicle;
converting, by the management computer, the at least one target function in the first data format to a data format of the vehicle;
accessing, by the management computer, a controller area network (CAN) bus of the vehicle; and
flashing, by the management computer via the CAN bus, the at least one controller of the vehicle so as to implement the at least one target function in the at least one controller of the vehicle,
wherein the flashing, by the management computer, the at least one controller of the vehicle so as to implement the at least one target function in the at least one controller of the vehicle comprises altering control software of the vehicle, and
wherein the at least one controller of the vehicle is configured to controls the vehicle in accordance with the at least one target function and to execute the control software that is altered.

2. The method as claimed in claim 1, wherein the at least one controller exchanges data with the external server in dependence on the at least one target function by using the management computer.

3. The method as claimed in claim 2, wherein the at least one controller, by using the management computer, conveys vehicle data to the external server in dependence on at least one of a current vehicle position, a current speed of the vehicle, current engine data of the vehicle, or current settings of the vehicle.

4. The method as claimed in claim 1, wherein the at least one target function increases a functional range of the at least one controller.

5. The method as claimed in claim 1, wherein part-functions of a function implemented on the at least one controller are implemented in the management computer and wherein part-operations are performed in the management computer and transferred to the at least one controller.

6. The method as claimed in claim 1, wherein respective functions to be carried out by the at least one controller are deposited retrievably on the external server.

7. The method as claimed in claim 1, wherein a respective function implemented on the at least one controller is performed on the external server and subsequently transferred to the management computer and from the management computer to the at least one controller.

8. The method as claimed in claim 1, wherein an unambiguous security key which must be provided for an access to the at least one controller from the external server is allocated to the management computer.

9. A vehicle, comprising:
at least one controller;
a management computer; and
a wireless interface configured to receive at least one target function from an external server in a first data format,
wherein the management computer is configured to: convert the at least one target function in the first data format to a data format of the vehicle; access a controller area network (CAN) bus of the vehicle, and flash the at least one controller via the CAN bus so as to implement the at least one target function in the at least one controller by altering control software of the vehicle, and
wherein the at least one controller is configured to execute the control software that is altered.

10. A management system for functions of a vehicle, the management system comprising:
at least one external server;
at least one controller in the vehicle; and
a management computer in the vehicle,
wherein the management computer is configured to:
receive, via a wireless interface, at least one target function in a first data format from the at least one external server,
convert the at least one target function in the first data format to a data format of the vehicle;
access a controller area network (CAN) bus of the vehicle, and
flash the at least one controller via the CAN bus so as to implement the at least one target function in the at least one controller by altering control software of the vehicle, and
wherein the at least one controller is configured to execute the control software that is altered.

11. The management system as claimed in claim 10, wherein the at least one external server is configured to call up the at least one target function from a further server and to transmit the at least one target function to the management computer.

12. The management system as claimed in claim 10, wherein the management computer is a controller originally provided for controlling a component of the vehicle.

13. The management system as claimed in claim 10, wherein the management computer is part of a controller already present in the vehicle.

14. The management system as claimed in claim 13, wherein the controller already present in the vehicle emulates or simulates the management computer.

15. The method as claimed in claim 1, wherein accessing, by the management computer, the CAN bus of the vehicle comprises providing, by the management computer, a security key.

16. The method as claimed in claim 15, wherein the security key is stored at a memory of the management computer.

17. The method as claimed in claim 1, wherein accessing, by the management computer, the CAN bus of the vehicle comprises accessing a control command set of the vehicle.

* * * * *